US012413086B2

(12) United States Patent
Ning et al.

(10) Patent No.: US 12,413,086 B2
(45) Date of Patent: Sep. 9, 2025

(54) ADJUSTING A CHARGING RATE OF A BATTERY OF AN INFORMATION HANDLING SYSTEM

(71) Applicant: Dell Products L.P., Round Rock, TX (US)

(72) Inventors: Yan Ning, Cedar Park, TX (US); Bruce A. Miller, Georgetown, TX (US); Wen-Yung Chang, Taoyuan (TW); Jui Chin Fang, Taipei (TW)

(73) Assignee: Dell Products L.P., Round Rock, TX (US)

( * ) Notice: Subject to any disclaimer, the term of this patent is extended or adjusted under 35 U.S.C. 154(b) by 665 days.

(21) Appl. No.: 17/660,779

(22) Filed: Apr. 26, 2022

(65) Prior Publication Data

US 2023/0344263 A1 Oct. 26, 2023

(51) Int. Cl.
*H02J 7/00* (2006.01)
(52) U.S. Cl.
CPC .......... *H02J 7/0071* (2020.01); *H02J 7/0069* (2020.01); *H02J 7/0048* (2020.01); *H02J 7/0049* (2020.01); *H02J 7/00712* (2020.01); *H02J 7/007188* (2020.01)
(58) Field of Classification Search
CPC ............. H02J 7/007188; H02J 7/00712; H02J 7/007182; H02J 7/0048; H02J 7/0049; H02J 7/0071; H02J 7/0069
USPC ........................................................ 320/155
See application file for complete search history.

(56) References Cited

U.S. PATENT DOCUMENTS

| 6,194,874 B1* | 2/2001 | Kalogeropoulos ... | H02J 7/0071 320/160 |
| 2007/0090806 A1* | 4/2007 | Hoffer ..................... | G06F 1/263 320/134 |
| 2007/0139011 A1* | 6/2007 | Lin ........................ | H02J 7/0071 320/128 |
| 2010/0102779 A1* | 4/2010 | Ahn ................... | H02J 7/007186 320/157 |
| 2016/0380441 A1* | 12/2016 | Groat ...................... | H02J 7/007 320/107 |
| 2017/0256973 A1* | 9/2017 | Kim ....................... | H02J 7/0071 |
| 2020/0280205 A1* | 9/2020 | Kim ....................... | H02J 7/0071 |
| 2022/0173606 A1* | 6/2022 | Mihara ................. | H01M 10/44 |

* cited by examiner

*Primary Examiner* — Julian D Huffman
*Assistant Examiner* — John Ondrasik
(74) *Attorney, Agent, or Firm* — McDermott Will & Schulte LLP

(57) ABSTRACT

Adjusting a charging rate of battery of an information handling system, the method comprising: determining, at a first time, a first accumulation of time over a first time period that i) a state of charge (SOC) of the battery indicates that the battery is fully charged and that ii) the battery is connected to a power source; comparing the first accumulation of time with a time threshold; determining, based on the comparing, that the first accumulation of time is greater than the time threshold, and in response: decreasing a charging voltage of the battery from a nominal level to a first decreased level; charging the battery based on the charging voltage having the first decreased level.

17 Claims, 3 Drawing Sheets

ADJUSTING A CHARGING RATE OF A BATTERY OF AN INFORMATION HANDLING SYSTEM

BACKGROUND

Field of the Disclosure

The disclosure relates generally to an information handling system, and in particular, adjusting a charging rate of a battery of the information handling system.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

More users are operating their information handling systems (e.g., portable computing devices such as laptops) for longer period of times under AC user conditions. However, batteries of these information handling systems can, under such use conditions, decay faster as the battery is under high voltage and temperature conditions which can result in irreversible capacity loss of the battery.

SUMMARY

Innovative aspects of the subject matter described in this specification may be embodied in a method of adjusting a charging rate of battery of an information handling system, the method including determining, at a first time, a first accumulation of time over a first time period that i) a state of charge (SOC) of the battery indicates that the battery is fully charged and that ii) the battery is connected to a power source; comparing the first accumulation of time with a time threshold; determining, based on the comparing, that the first accumulation of time is greater than the time threshold, and in response: decreasing a charging voltage of the battery from a nominal level to a first decreased level; charging the battery based on the charging voltage having the first decreased level; determining, at a second time after the first time, a second accumulation of time over a second time period that i) the SOC of the battery indicates that the battery is fully charged and that ii) the battery is connected to the power source; comparing the second accumulation of time with the time threshold; determining, based on the comparing, that the second accumulation of time is greater than the time threshold, and in response: decreasing the charging voltage of the battery from the first decreased level to a second decreased level, the second decreased level less than the first decreased level; and charging the battery based on the charging voltage having the second decreased level.

Other embodiments of these aspects include corresponding systems, apparatus, and computer programs, configured to perform the actions of the methods, encoded on computer storage devices.

These and other embodiments may each optionally include one or more of the following features. For instance, determining, based on the comparing, that the first accumulation of time is less than the threshold, and in response: determining, at a third time after the first time, a third accumulation of time over a third time period that i) the SOC of the battery indicates that the battery is fully charged and that ii) the battery is connected to a power source; and comparing the third accumulation of time with the time threshold. After decreasing the charging voltage of the battery from the first decreased level to the second decreased level: determining, at a fourth time after the first time, that i) the battery is disconnected from the power source and that ii) a discharged capacity of the battery is greater than a discharge capacity threshold, and in response: increasing the charging voltage of the battery from the second decreased level to the first decreased level. After decreasing the charging voltage of the battery from the first decreased level to the second decreased level: determining, at a fourth time after the first time, that i) the battery is connected to the power source and/or that ii) a discharged capacity of the battery is less than a discharge capacity threshold, and in response: determining, at a fifth time after the fourth time, that i) the battery is disconnected from the power source, and that ii) a charge capacity of the battery is less than a battery charge capacity threshold of the battery, and in response: increasing the charging voltage of the battery from the second decreased level to the nominal level. After decreasing the charging voltage of the battery from the first decreased level to the second decreased level: determining, at a fourth time after the first time, that i) the battery is connected to the power source and/or that ii) a discharged capacity of the battery is less than a discharge capacity threshold, and in response: determining, at a fifth time after the fourth time, that i) the battery is connected to the power source, and/or that ii) a charge capacity of the battery is greater than a battery charge capacity threshold of the battery, and in response: determining, at a sixth time after the fifth time, a third accumulation of time over a third time period that i) the SOC of the battery indicates that the battery is fully charged and that ii) the battery is connected to the power source; and comparing the third accumulation of time with the time threshold. The second time period overlaps with at least a portion of the first time period. The battery is fully charged when the SOC of the battery is 100%.

Particular implementations of the subject matter described in this specification can be implemented so as to realize one or more of the following advantages. For example, early detection of AC user mode based on individual usage condition; monitoring of user behavior to take additional actions with multiple levels of charge voltage reductions; and recover charge voltage in response to user behavior.

The details of one or more embodiments of the subject matter described in this specification are set forth in the accompanying drawings and the description below. Other potential features, aspects, and advantages of the subject matter will become apparent from the description, the drawings, and the claims.

DESCRIPTION OF PARTICULAR EMBODIMENT(S)

Figure 1:
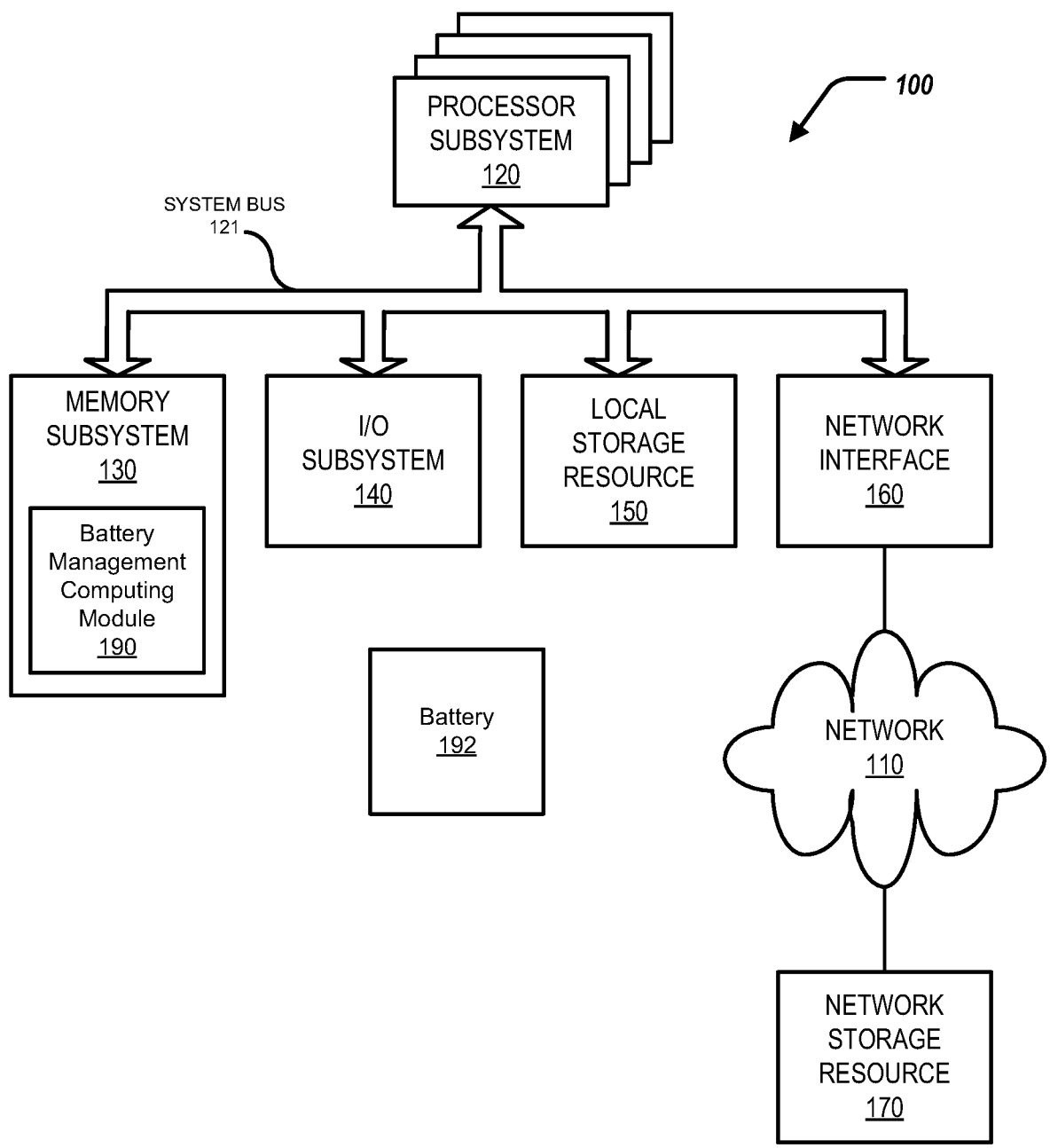
FIG. 1 is a block diagram of selected elements of an embodiment of an information handling system.

This disclosure discusses methods and systems for adjusting a charging rate of a battery of an information handling system. In short, a battery management computing module can facilitate reduction degradation of the battery using a dynamic charge voltage solution in response to customer usage behaviors. The dynamic charge voltage solution can be based on an accumulated time, during a moving window, when the battery is under a full charge state with an AC adaptor coupled to the information handling system that provides charge to the battery. The battery management computing module can drive multiple charge voltage reductions to increase the life span of the battery. The battery management computing module can increase the charge voltage of the battery when the user drains a significant amount of battery energy.

Specifically, this disclosure discusses a system and a method for adjusting a charging rate of battery of an information handling system, the method including determining, at a first time, a first accumulation of time over a first time period that i) a state of charge (SOC) of the battery indicates that the battery is fully charged and that ii) the battery is connected to a power source; comparing the first accumulation of time with a time threshold; determining, based on the comparing, that the first accumulation of time is greater than the time threshold, and in response: decreasing a charging voltage of the battery from a nominal level to a first decreased level; charging the battery based on the charging voltage having the first decreased level; determining, at a second time after the first time, a second accumulation of time over a second time period that i) the SOC of the battery indicates that the battery is fully charged and that ii) the battery is connected to the power source; comparing the second accumulation of time with the time threshold; determining, based on the comparing, that the second accumulation of time is greater than the time threshold, and in response: decreasing the charging voltage of the battery from the first decreased level to the second decreased level, the second decreased level less than the first decreased level; charging the battery based on the charged voltage having the second decreased voltage.

In the following description, details are set forth by way of example to facilitate discussion of the disclosed subject matter. It should be apparent to a person of ordinary skill in the field, however, that the disclosed embodiments are exemplary and not exhaustive of all possible embodiments.

For the purposes of this disclosure, an information handling system may include an instrumentality or aggregate of instrumentalities operable to compute, classify, process, transmit, receive, retrieve, originate, switch, store, display, manifest, detect, record, reproduce, handle, or utilize various forms of information, intelligence, or data for business, scientific, control, entertainment, or other purposes. For example, an information handling system may be a personal computer, a PDA, a consumer electronic device, a network storage device, or another suitable device and may vary in size, shape, performance, functionality, and price. The information handling system may include memory, one or more processing resources such as a central processing unit (CPU) or hardware or software control logic. Additional components of the information handling system may include one or more storage devices, one or more communications ports for communicating with external devices as well as various input and output (I/O) devices, such as a keyboard, a mouse, and a video display. The information handling system may also include one or more buses operable to transmit communication between the various hardware components.

For the purposes of this disclosure, computer-readable media may include an instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory (SSD); as well as communications media such wires, optical fibers, microwaves, radio waves, and other electromagnetic and/or optical carriers; and/or any combination of the foregoing.

Figure 2:
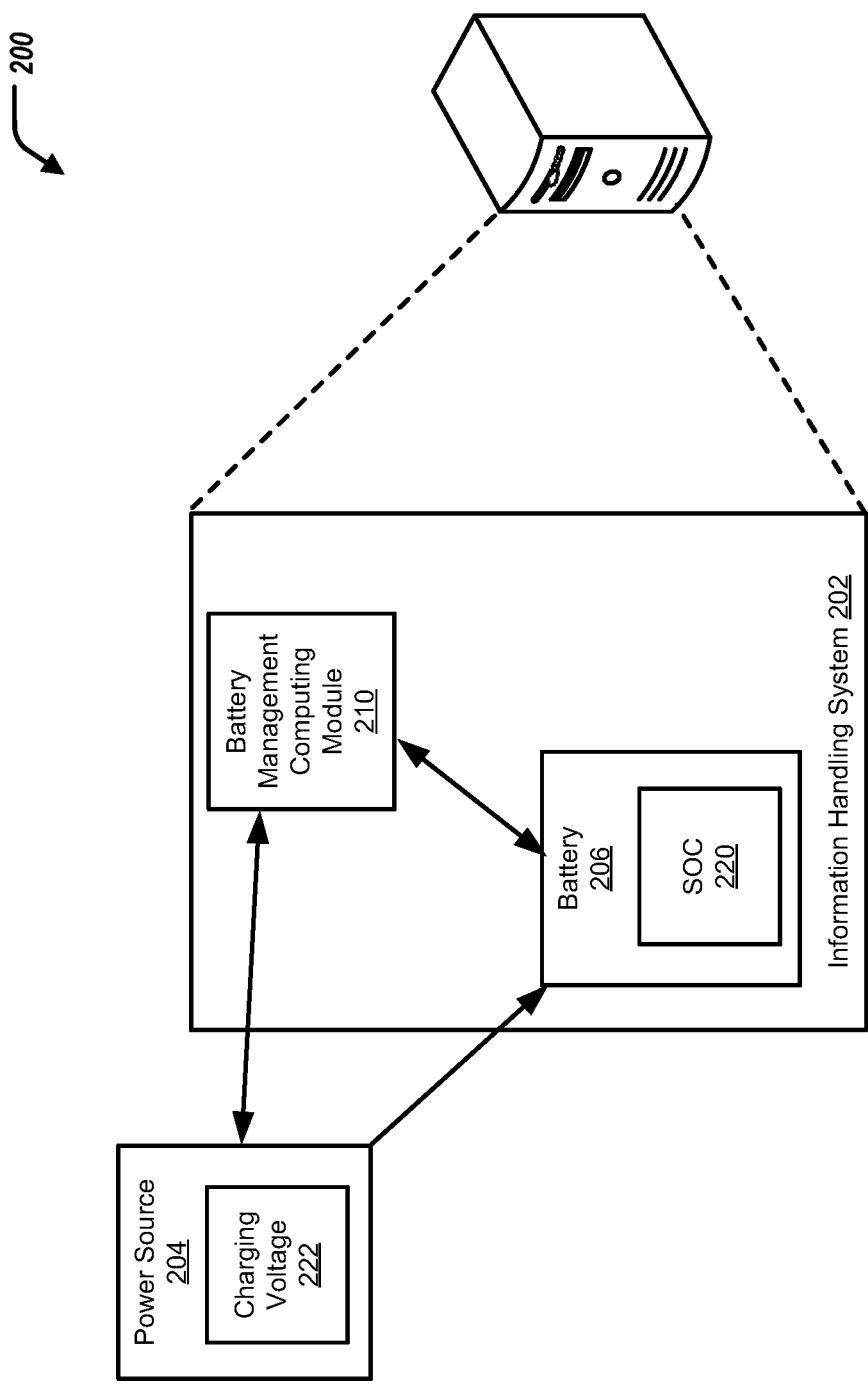
FIG. 2 illustrates a block diagram of a computing environment including the information handling system and a power source.
Figure 3:
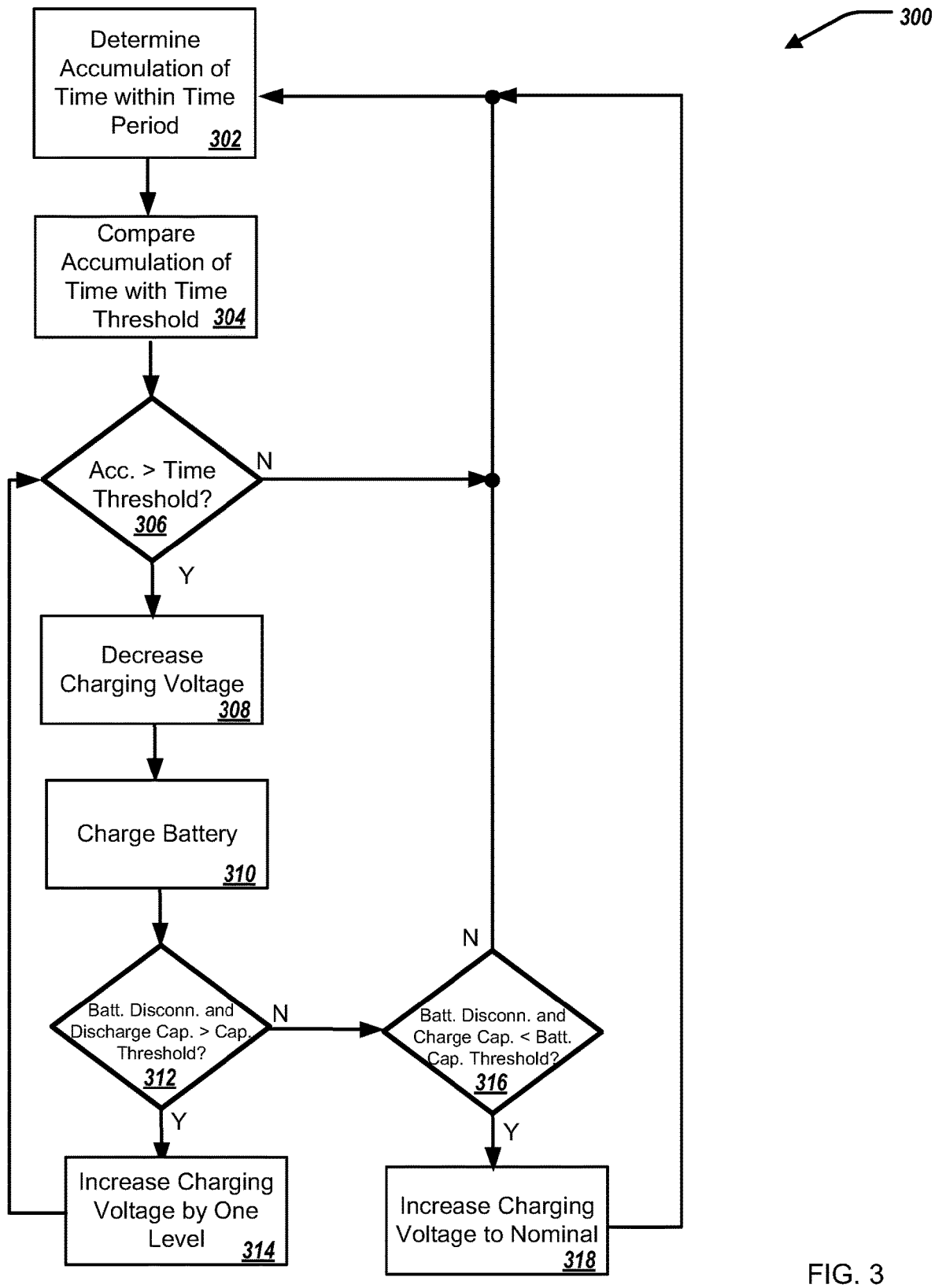
FIG. 3 illustrates a method for adjusting a charging rate of a battery of the information handling system.

Particular embodiments are best understood by reference to FIGS. 1-3 wherein like numbers are used to indicate like and corresponding parts.

Turning now to the drawings, FIG. 1 illustrates a block diagram depicting selected elements of an information handling system 100 in accordance with some embodiments of the present disclosure. In various embodiments, information handling system 100 may represent different types of portable information handling systems, such as, display devices, head mounted displays, head mount display systems, smart phones, tablet computers, notebook computers, media players, digital cameras, 2-in-1 tablet-laptop combination computers, and wireless organizers, or other types of portable information handling systems. In one or more embodiments, information handling system 100 may also represent other types of information handling systems, including desktop computers, server systems, controllers, and microcontroller units, among other types of information handling systems. Components of information handling system 100 may include, but are not limited to, a processor subsystem 120, which may comprise one or more processors, and system bus 121 that communicatively couples various system components to processor subsystem 120 including, for example, a memory subsystem 130, an I/O subsystem 140, a local storage resource 150, and a network interface 160. System bus 121 may represent a variety of suitable types of bus structures, e.g., a memory bus, a peripheral bus, or a local bus using various bus architectures in selected embodiments. For example, such architectures may include, but are not limited to, Micro Channel Architecture (MCA) bus, Industry Standard Architecture (ISA) bus, Enhanced ISA (EISA) bus, Peripheral Component Interconnect (PCI) bus, PCI-Express bus, HyperTransport (HT) bus, and Video Electronics Standards Association (VESA) local bus.

As depicted in FIG. 1, processor subsystem 120 may comprise a system, device, or apparatus operable to interpret and/or execute program instructions and/or process data, and may include a microprocessor, microcontroller, digital signal processor (DSP), application specific integrated circuit (ASIC), or another digital or analog circuitry configured to interpret and/or execute program instructions and/or process data. In some embodiments, processor subsystem 120 may interpret and/or execute program instructions and/or process data stored locally (e.g., in memory subsystem 130 and/or another component of information handling system). In the same or alternative embodiments, processor subsystem 120 may interpret and/or execute program instructions and/or process data stored remotely (e.g., in network storage resource 170).

Also in FIG. 1, memory subsystem 130 may comprise a system, device, or apparatus operable to retain and/or retrieve program instructions and/or data for a period of time (e.g., computer-readable media). Memory subsystem 130 may comprise random access memory (RAM), electrically erasable programmable read-only memory (EEPROM), a PCMCIA card, flash memory, magnetic storage, opto-magnetic storage, and/or a suitable selection and/or array of volatile or non-volatile memory that retains data after power to its associated information handling system, such as system 100, is powered down.

In information handling system 100, I/O subsystem 140 may comprise a system, device, or apparatus generally operable to receive and/or transmit data to/from/within information handling system 100. I/O subsystem 140 may represent, for example, a variety of communication interfaces, graphics interfaces, video interfaces, user input interfaces, and/or peripheral interfaces. In various embodiments, I/O subsystem 140 may be used to support various peripheral devices, such as a touch panel, a display adapter, a keyboard, an accelerometer, a touch pad, a gyroscope, an IR sensor, a microphone, a sensor, or a camera, or another type of peripheral device.

Local storage resource 150 may comprise computer-readable media (e.g., hard disk drive, floppy disk drive, CD-ROM, and/or other type of rotating storage media, flash memory, EEPROM, and/or another type of solid state storage media) and may be generally operable to store instructions and/or data. Likewise, the network storage resource may comprise computer-readable media (e.g., hard disk drive, floppy disk drive, CD-ROM, and/or other type of rotating storage media, flash memory, EEPROM, and/or other type of solid state storage media) and may be generally operable to store instructions and/or data.

In FIG. 1, network interface 160 may be a suitable system, apparatus, or device operable to serve as an interface between information handling system 100 and a network 110. Network interface 160 may enable information handling system 100 to communicate over network 110 using a suitable transmission protocol and/or standard, including, but not limited to, transmission protocols and/or standards enumerated below with respect to the discussion of network 110. In some embodiments, network interface 160 may be communicatively coupled via network 110 to a network storage resource 170. Network 110 may be a public network or a private (e.g. corporate) network. The network may be implemented as, or may be a part of, a storage area network (SAN), personal area network (PAN), local area network (LAN), a metropolitan area network (MAN), a wide area network (WAN), a wireless local area network (WLAN), a virtual private network (VPN), an intranet, the Internet or another appropriate architecture or system that facilitates the communication of signals, data and/or messages (generally referred to as data). Network interface 160 may enable wired and/or wireless communications (e.g., NFC or Bluetooth) to and/or from information handling system 100.

In particular embodiments, network 110 may include one or more routers for routing data between client information handling systems 100 and server information handling systems 100. A device (e.g., a client information handling system 100 or a server information handling system 100) on network 110 may be addressed by a corresponding network address including, for example, an Internet protocol (IP) address, an Internet name, a Windows Internet name service (WINS) name, a domain name or other system name. In particular embodiments, network 110 may include one or more logical groupings of network devices such as, for example, one or more sites (e.g. customer sites) or subnets. As an example, a corporate network may include potentially thousands of offices or branches, each with its own subnet (or multiple subnets) having many devices. One or more client information handling systems 100 may communicate with one or more server information handling systems 100 via any suitable connection including, for example, a modem connection, a LAN connection including the Ethernet or a broadband WAN connection including DSL, Cable, Ti, T3, Fiber Optics, Wi-Fi, or a mobile network connection including GSM, GPRS, 3G, or WiMax.

Network 110 may transmit data using a desired storage and/or communication protocol, including, but not limited to, Fibre Channel, Frame Relay, Asynchronous Transfer Mode (ATM), Internet protocol (IP), other packet-based protocol, small computer system interface (SCSI), Internet SCSI (iSCSI), Serial Attached SCSI (SAS) or another transport that operates with the SCSI protocol, advanced technology attachment (ATA), serial ATA (SATA), advanced technology attachment packet interface (ATAPI), serial storage architecture (SSA), integrated drive electronics (IDE), and/or any combination thereof. Network 110 and its various components may be implemented using hardware, software, or any combination thereof.

The information handling system 100 can also include a battery management computing module 190. The battery management computing module 190 can be included by the memory subsystem 130. The battery management computing module 190 can include a computer-executable program (software). The battery management computing module 190 can be executed by the processor subsystem 120.

The information handling system 100 can further include a battery 192.

In short, the battery management computing module 190 can facilitate reduction of degradation of the battery 192 using a dynamic charge voltage solution in response to customer usage behaviors. The dynamic charge voltage solution can be based on an accumulated time, during a moving window, when the battery 192 is under a full charge state with an AC adaptor coupled to the information handling system 100 that provides charge to the battery 192. The battery management computing module 190 can drive multiple charge voltage reductions to increase the life span of the battery 192. The battery management computing module 190 can increase the charge voltage of the battery 192 when the user drains a significant amount of battery energy.

Turning to FIG. 2, FIG. 2 illustrates an environment 200 including an information handling system 202 and a power source 204. The information handling system 202 can include a battery 206 and a battery management computing module 210.

In some examples, the information handling system 202 is similar to, or includes, the information handling system 100 of FIG. 1. In some examples, the battery management computing module 210 is the same, or substantially the same, as the battery management computing module 190 of FIG. 1. In some examples, the battery 206 is the same, or substantially the same, as the battery 192 of FIG. 1.

The battery management computing module 210 can be in communication with the power source 204 and the battery 206. The power source 204 can be in communication with the battery 206, and provide power to the battery 206, described further herein.

FIG. 3 illustrates a flowchart depicting selected elements of an embodiment of a method 300 for adjusting a charging rate of the battery 206 of the information handling system 202. The method 300 may be performed by the information handling system 100, the information handling system 202, and/or the battery management computing module 210, and with reference to FIGS. 1-2. It is noted that certain operations described in method 300 may be optional or may be rearranged in different embodiments.

The battery management computing module 210 determines, at a first time, a first accumulation of time over a first time period that i) a state of charge (SOC) 220 of the battery 206 indicates that the battery 206 is fully charged and that ii) the battery 206 is connected to the power source 204, at 302. In some examples, the battery 206 is fully charged when the SOC 220 of the battery is 100%. In some examples, the battery 206 is fully charged when the SOC 220 of the battery is approximately 100%. For example, the battery management computing module 210 determines that the first accumulation of time that the battery 206 is fully charged and is coupled/connected to the power source 204 (receiving electrical energy from the power source 204). For example, the first time period can be a moving time period. For example, the first time period can be seven days.

The battery management computing module 210 compares the first accumulation of time with a time threshold, at 304. For example, the time threshold can be seventy-two hours when the first time period is seven days.

The battery management computing module 210, determines, based on comparing the first accumulation of time with the time threshold, whether the first accumulation of time is greater than the time threshold, at 306. In some examples, the battery management computing module 210, determines, based on comparing the first accumulation of time with the time threshold, that the first accumulation of time is greater than the time threshold. The battery management computing module 210, in response to determining that the first accumulation of time is greater than the time threshold, decreases a charging voltage 222 (or charging rate 222) (supplied by the power source 204) of the battery 206 from a nominal level to a first decreased level, at 308. Decreasing the charging voltage 222 of the battery 206 to the first decreased level can reduce a battery longevity decay of the battery 206. For example, the battery management computing module 210 can decrease the charging voltage 222 of the battery 206 by 10%.

The power source 204 can charge the battery 206 based on the charging voltage 222 having the first decreased level, at 310. In some examples, the power source 204 can charge the battery 206, based on the charging voltage 222 having the first decreased level, to a fully charged SOC.

The battery management computing module 210, after decreasing the charging voltage of the battery 206 to the first decreased level, determines, at a second time after the first time, whether i) the battery 206 is not connected to (disconnected from) the power source 204 and ii) a discharged capacity of the battery 206 is greater than a discharge capacity threshold, at 312. The discharged capacity of the battery 206 can include an amount that the battery 206 has been discharged (from use). That is, the battery management computing module 210, can compare the discharged capacity of the battery 206 to a discharge capacity threshold (e.g., a percentage of the full charge capacity of the battery 206). For example, the discharged capacity threshold of the battery 206 can be 30% of the full charge capacity of the battery 206. In some examples, the battery management computing module 210 determines that i) the battery 206 is connected to the power source 204 (not disconnected from the power source 204) and/or ii) the discharged capacity of the battery 206 is not greater than the discharge capacity threshold (less than the discharge capacity threshold).

The battery management computing module 210, in response to determining that i) the battery 206 is connected to the power source 204 and/or ii) the discharged capacity of the battery 206 is not greater than the discharge capacity threshold (less than the discharge capacity threshold), determines, at a third time after the second time, whether i) the battery 206 is not connected to (disconnected from) the power source 204 and ii) a charge capacity (state of charge) of the battery 206 is less than a battery charge capacity threshold of the battery 206, at 316. The charge capacity of the battery 206 can include a SOC of the battery 206. The charge capacity threshold of the battery 206 can include a percentage of a fully charged battery 206. In some examples, the battery management computing module 210 determines that i) the battery 206 is connected to the power source 204 (not disconnected from the power source 204) and/or ii) the charge capacity of the battery 206 is not less than the battery charge capacity threshold of the battery 206 (greater than the battery charge capacity threshold of the battery 206). The battery management computing module 210, in response to determining that that i) the battery 206 is connected to the power source 204 and/or ii) the charge capacity (state of charge) of the battery 206 is not less than the battery charge capacity threshold of the battery 206 (greater than the battery charge capacity threshold of the battery 206), returns to 302.

That is, the battery management computing module 210 determines, at a fourth time after the third time, a second accumulation of time over a second time period that i) the SOC 220 of the battery 206 indicates that the battery 206 is fully charged and that ii) the battery 206 is connected to the power source 204, at 302. For example, the battery management computing module 210 determines, the second accumulation of time that the battery 206 is fully charged and is coupled/connected to the power source 204 (receiving electrical energy from the power source 204). For example, the second time period can be a moving time period. For example, the second time period can be seven days. In some examples, the second time period overlaps with at least a portion of the first time period.

The battery management computing module 210 compares the second accumulation of time with the time threshold, at 304.

The battery management computing module 210, determines, based on comparing the second accumulation of time with the time threshold, whether the second accumulation of time is greater than the time threshold, at 306. In some examples, the battery management computing module 210, determines, based on comparing the second accumulation of time with the time threshold that the second accumulation of time is greater than the time threshold. The battery management computing module 210, in response to determining that the time period that the second accumulation of time is greater than the time threshold, decreases the charging voltage 222 (or charging rate 222) (supplied by the power source 204) of the battery 206 from the first decreased level to a second decreased level, at 308. Decreasing the charging voltage 222 of the battery 206 to the second decreased level can reduce a battery longevity decay of the battery 206. For example, the battery management computing module 210 can decrease the charging voltage 222 of the battery 206 by (another) 10% (in addition to the 10% reduction with the first decreased level)—a total decrease of 20% of the charging voltage 222.

The power source 204 can charge the battery 206 based on the charging voltage 222 having the second decreased level, at 310. In some examples, the power source 204 can charge the battery 206, based on the charging voltage 222 having the first decreased level, to a fully charged SOC.

To that end, the battery management computing module 210 can facilitate (automatically) adjusting/changing the charging voltage 222 by multiple levels when the battery 206 is coupled/connected to the power source 204. In other words, the battery management computing module 210 facilitates multi-level charge voltage reductions of the battery 206.

In some examples, after the battery 206 is charged (at 310), the information handling system 202 can be utilized such that a power consumption rate of the battery 206 exceeds the charging rate of the battery 206, resulting in a lowering SOC of the battery 206.

In some examples, the battery management computing module 210, at 312, determines that i) the battery 206 is not connected to (disconnected from) the power source 204 and ii) the discharged capacity of the battery 206 is greater the discharge capacity threshold. For example, the discharge capacity threshold of the battery 206 can be 30% of the full charge capacity of the battery 206. That is, for example, the battery management computing module 210, at 312, can determine that the battery 206 is not connected to the power source 204 and the discharged capacity of the battery 206 is greater than the discharge capacity threshold (the discharged capacity of the battery 206 is greater than the discharge capacity threshold). For example, the battery management computing module 210, at 312, can determine that the battery 206 is not connected to the power source 204 and the discharged capacity of the battery 206 (30%) is greater than the discharge capacity threshold (25%) (e.g., the battery 206 has only 70% SOC remaining). The battery management computing module 210, in response to determining that i) the battery 206 is not connected to the power source 204 and ii) the discharged capacity of the battery 206 is less than the discharge capacity threshold, increases the charging voltage 222 of the battery 206 from the second decreased level to the first decreased level, at 314. For example, the battery management computing module 210, can increase the charging voltage 222 of the battery 206 by 10% (from a 20% reduction in the charging voltage 222 to a 10% reduction in the charging voltage 222). The process then proceeds to step 302.

In some examples, the battery management computing module 210 determines that i) the battery 206 is not connected to the power source 204 and ii) the charge capacity (state of charge) of the battery 206 is less than the battery charge capacity threshold of the battery 206, at 316. For example, the battery charge capacity threshold is 20%. That is, for example, the battery management computing module 210, at 312, can determine that the battery 206 is not connected to the power source 204 and the charge capacity of the battery 206 (SOC) is less than the battery charge capacity threshold. For example, the battery management computing module 210, at 312, can determine that the battery 206 is not connected to the power source 204 and the charge capacity (SOC) of the battery 206 (15%) is less than the battery charge capacity threshold (20%).

The battery management computing module 210, in response to determining that i) the battery 206 is not connected to the power source 204 and ii) the charge capacity (state of charge) of the battery 206 is less than the battery charge capacity threshold of the battery 206, increases the charging voltage 222 of the battery 206 to the nominal level, at 318. For example, the battery management computing module 210, can increase the charging voltage 222 of the battery 206 by 20% (from a 20% reduction in the charging voltage 222 to a 0% reduction in the charging voltage 222 such that the charging voltage 222 is nominal). The process then proceeds to step 302.

In some examples, the battery management computing module 210, determines, based on comparing the first accumulation of time with the time period, that the first accumulation of time is less than the time threshold, at 306. The battery management computing module 210, in response to determining that the time period that the first accumulation of time is less than the time threshold, proceeds to step 302.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated other-wise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, features, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A computer-implemented method of adjusting a charging rate of battery of an information handling system, the method comprising:

determining, at a first time, a first accumulation of time over a first time period that i) a state of charge (SOC) of the battery indicates that the battery is fully charged and that ii) the battery is connected to a power source;

comparing the first accumulation of time with a time threshold;

determining, based on the comparing, that the first accumulation of time is greater than the time threshold, and in response:

decreasing a charging voltage of the battery from a nominal level to a first decreased level;

charging the battery based on the charging voltage having the first decreased level;

determining, at a second time after the first time, a second accumulation of time over a second time period that i) the SOC of the battery indicates that the battery is fully charged and that ii) the battery is connected to the power source;

comparing the second accumulation of time with the time threshold;

determining, based on the comparing, that the second accumulation of time is greater than the time threshold, and in response:

decreasing the charging voltage of the battery from the first decreased level to a second decreased level, the second decreased level less than the first decreased level;

charging the battery based on the charging voltage having the second decreased level;

determining, at a third time after the second time, whether i) the battery is connected to the power source and ii) an amount the battery has been discharged is less than a discharge capacity threshold;

determining, at the third time, that i) the battery is connected to the power source and ii) the amount the battery has been discharged is less than the discharge capacity threshold, and in response;

determining, at a fourth time after the third time, whether i) the battery is disconnected from the power source and ii) the SOC of the battery is less than a battery charge capacity threshold of the battery;

determining, at the fourth time, that i) the battery is disconnected from the power source and ii) the SOC of the battery is less than the battery charge capacity threshold of the battery, and in response:

after the battery is connected to the power source, increasing the charging voltage of the battery from the second decreased level to the nominal level.

2. The computer-implemented method of claim 1, further comprising:

determining, based on the comparing, that the first accumulation of time is less than the threshold, and in response:

determining, after the first time, a third accumulation of time over a third time period that i) the SOC of the battery indicates that the battery is fully charged and that ii) the battery is connected to a power source; and comparing the third accumulation of time with the time threshold.

3. The computer-implemented method of claim 1, after decreasing the charging voltage of the battery from the first decreased level to the second decreased level:

determining, at the third time, that i) the battery is disconnected from the power source and that ii) the amount the battery has been discharged is greater than the discharge capacity threshold, and in response:

after the battery is connected to the power source, increasing the charging voltage of the battery from the second decreased level to the first decreased level.

4. The computer-implemented method of claim 1, further including:

determining, at the fourth time, that i) the battery is connected to the power source, and/or that ii) the SOC of the battery is greater than the battery charge capacity threshold of the battery, and in response:

determining, at fifth time after the fourth time, a third accumulation of time over a third time period that i) the SOC of the battery indicates that the battery is fully charged and that ii) the battery is connected to the power source; and comparing the third accumulation of time with the time threshold.

5. The computer-implemented method of claim 1, wherein the second time period overlaps with at least a portion of the first time period.

6. The computer-implemented method of claim 1, wherein the battery is fully charged when the SOC of the battery is 100%.

7. An information handling system comprising a processor having access to memory media storing instructions executable by the processor to perform operations, comprising:

determining, at a first time, a first accumulation of time over a first time period that i) a state of charge (SOC) of the battery indicates that the battery is fully charged and that ii) the battery is connected to a power source;

comparing the first accumulation of time with a time threshold;

determining, based on the comparing, that the first accumulation of time is greater than the time threshold, and in response:

decreasing a charging voltage of the battery from a nominal level to a first decreased level;

charging the battery based on the charging voltage having the first decreased level;

determining, at a second time after the first time, a second accumulation of time over a second time period that i) the SOC of the battery indicates that the battery is fully charged and that ii) the battery is connected to the power source;

comparing the second accumulation of time with the time threshold;

determining, based on the comparing, that the second accumulation of time is greater than the time threshold, and in response:

decreasing the charging voltage of the battery from the first decreased level to a second decreased level, the second decreased level less than the first decreased level;

charging the battery based on the charging voltage having the second decreased level;

determining, at a third time after the second time, whether i) the battery is connected to the power source and ii) an amount the battery has been discharged is less than a discharge capacity threshold;

determining, at the third time, that i) the battery is connected to the power source and ii) the amount the battery has been discharged is less than the discharge capacity threshold, and in response;

determining, at a fourth time after the third time, whether i) the battery is disconnected from the power source and ii) the SOC of the battery is less than a battery charge capacity threshold of the battery;

determining, at the fourth time, that i) the battery is disconnected from the power source and ii) the SOC of the battery is less than the battery charge capacity threshold of the battery, and in response:

after the battery is connected to the power source, increasing the charging voltage of the battery from the second decreased level to the nominal level.

8. The information handling system of claim 7, the operations further comprising:

determining, based on the comparing, that the first accumulation of time is less than the threshold, and in response:

determining, after the first time, a third accumulation of time over a third time period that i) the SOC of the battery indicates that the battery is fully charged and that ii) the battery is connected to a power source; and comparing the third accumulation of time with the time threshold.

9. The information handling system of claim 7, after decreasing the charging voltage of the battery from the first decreased level to the second decreased level, the operations further comprising:

determining, at the third time, that i) the battery is disconnected from the power source and that ii) the amount the battery has been discharged is greater than the discharge capacity threshold, and in response:

after the battery is connected to the power source, increasing the charging voltage of the battery from the second decreased level to the first decreased level.

10. The information handling system of claim 7, the operations further comprising:

determining, at after the fourth time, that i) the battery is connected to the power source, and/or that ii) the SOC of the battery is greater than the battery charge capacity threshold of the battery, and in response:

determining, at a fifth time after the fourth time, a third accumulation of time over a third time period that i) the SOC of the battery indicates that the battery is fully charged and that ii) the battery is connected to the power source; and comparing the third accumulation of time with the time threshold.

11. The information handling system of claim 7, wherein the second time period overlaps with at least a portion of the first time period.

12. The information handling system of claim 7, wherein the battery is fully charged when the SOC of the battery is 100%.

13. A non-transitory computer-readable medium storing software comprising instructions executable by one or more computers which, upon such execution, cause the one or more computers to perform operations comprising:

determining, at a first time, a first accumulation of time over a first time period that i) a state of charge (SOC) of the battery indicates that the battery is fully charged and that ii) the battery is connected to a power source;

comparing the first accumulation of time with a time threshold;

determining, based on the comparing, that the first accumulation of time is greater than the time threshold, and in response:

decreasing a charging voltage of the battery from a nominal level to a first decreased level;

charging the battery based on the charging voltage having the first decreased level;

determining, at a second time after the first time, a second accumulation of time over a second time period that i) the SOC of the battery indicates that the battery is fully charged and that ii) the battery is connected to the power source;

comparing the second accumulation of time with the time threshold;

determining, based on the comparing, that the second accumulation of time is greater than the time threshold, and in response:

decreasing the charging voltage of the battery from the first decreased level to a second decreased level, the second decreased level less than the first decreased level;

charging the battery based on the charging voltage having the second decreased level;

determining, at a third time after the second time, whether i) the battery is connected to the power source and ii) an amount the battery has been discharged is less than a discharge capacity threshold;

determining, at the third time, that i) the battery is connected to the power source and ii) the amount the battery has been discharged is less than the discharge capacity threshold, and in response;

determining, at a fourth time after the third time, whether i) the battery is disconnected from the power source and ii) the SOC of the battery is less than a battery chargecapacity threshold of the battery;

determining, at the fourth time, that i) the battery is disconnected from the power source and ii) the SOC of the battery is less than the battery charge capacity threshold of the battery, and in response:

after the battery is connected to the power source, increasing the charging voltage of the battery from the second decreased level to the nominal level.

14. The non-transitory computer-readable medium of claim 13, the operations further comprising:

determining, based on the comparing, that the first accumulation of time is less than the threshold, and in response:

determining, after the first time, a third accumulation of time over a third time period that i) the SOC of the battery indicates that the battery is fully charged and that ii) the battery is connected to a power source; and comparing the third accumulation of time with the time threshold.

15. The non-transitory computer-readable medium of claim 13, after decreasing the charging voltage of the battery from the first decreased level to the second decreased level, the operations further comprising:

determining, at the third time, that i) the battery is disconnected from the power source and that ii) the amount the battery has been discharged is greater than the discharge capacity threshold, and in response:

after the battery is connected to the power source, increasing the charging voltage of the battery from the second decreased level to the first decreased level.

16. The non-transitory computer-readable medium of claim 13, the operations further comprising:

determining, at a fifth time after the fourth time, that i) the battery is connected to the power source, and/or that ii) the SOC of the battery is greater than the battery charge capacity threshold of the battery, and in response:

determining, at a fifth time after the fourth time, a third accumulation of time over a third time period that i) the SOC of the battery indicates that the battery is fully charged and that ii) the battery is connected to the power source; and comparing the third accumulation of time with the time threshold.

17. The non-transitory computer-readable medium of claim 13, wherein the second time period overlaps with at least a portion of the first time period.

\* \* \* \* \*